United States Patent Office 2,888,467
Patented May 26, 1959

2,888,467

ANTHRAQUINONYLOXY-BENZYL AMINE COMPOUNDS

John William Richter, Wilmington, Del., assignor to E. I. du Pont de Nemours and Company, Wilmington, Del., a corporation of Delaware No Drawing. Application June 13, 1957
Serial No. 665,599

3 Claims. (Cl. 260—380)

This invention relates to new anthraquinone compounds which are useful as dyes for a wide variety of synthetic fibers and particularly for acid modified polyester fiber (as described more fully in Belgian Patent No. 549,179) and for acid modified acrylic fiber (as described in U.S. Patent Nos. 2,837,500 and 2,837,501).

More particularly, this invention deals with novel compounds of the anthraquinone series which may be isolated and handled in free-base form and in the form of quaternary ammonium salts or tertiary amine salts of said bases, and whose free base form corresponds to the formula

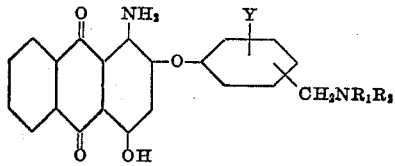

wherein $NR_1R_2$ represents a nitrogeneous base radical of the group consisting of dialkylamino, diethanolamino, monoalkyl-monoethanolamino, monoalkyl-monobenzylamino, monoethanolmonobenzylamino, morpholino and piperidino, said alkyl groups having not more than 4 C-atoms each, and wherein Y stands for hydrogen, methyl or methoxy.

According to accepted nomenclature, the group of new compounds may be designated as (1-amino-4-hydroxy-2-anthraquinonyloxy)benzylamines, their quaternary compounds, and tertiary amine salts.

This invention further embraces as an integral part thereof compounds of the formula

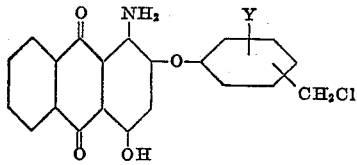

which are prepared as intermediates in the synthesis of said bases and salts, and wherein Y has the same meaning as above. These intermediates may be designated as 1-amino-2-(α-chlorotolyloxy)-4-hydroxyanthraquinones.

I find that the bases of the above formula as well as their salts and quaternary derivatives constitute red dyes which may be applied to acid modified polyester fiber or acid modified acrylic fiber from an aqueous bath, and which produce upon said fiber dyeings of good fastness to light, sublimation and washing.

The novel dyes of this invention are soluble in hot water, particularly in slightly acidified hot water. Consequently, they may be applied to acid modified fiber in the manner of basic dyes, that is, from mildly acidic aqueous solutions.

The quaternary compounds and tertiary amine salts of this invention may be synthesized by reacting with tertiary and secondary amines, respectively, in an organic solvent upon the intermediate 1-amino-2-(α-chloro-tolyloxy)-4-hydroxyanthraquinones of this invention, which in turn may be synthesized by reacting with bis-chloromethyl ether upon a 1-amino-4-hydroxy-2-phenoxyanthraquinone, in sulfuric acid solution. The novel bases of this invention may be obtained by reacting aqueous suspensions of the tertiary amine salts with an alkali metal hydroxide.

Without limiting this invention, the following examples are given to illustrate my preferred mode of operation. Parts mentioned are by weight.

*Example 1.—1-amino-2-(α-chloro-p-tolyloxy)-4-hydroxyanthraquinone*

To 1660 parts of concentrated sulfuric acid (96%) cooled to 0° C. was added 165 parts of 1-amino-4-hydroxy-2-phenoxyanthraquinone with stirring. To this mixture was added slowly over a period of one hour 216 parts of bis-chloromethyl ether at 0° to 10° C. The mixture was allowed to warm slowly to 20° C. and then stirred at this temperature for one hour. It was poured onto 4000 parts of cracked ice. The product was collected on a filter, washed with water until acid free, and dried at 60° C. This material was dissolved in 1320 parts of boiling chlorobenzene and filtered hot to remove some insoluble compounds. After cooling the filtrate in an ice bath and diluting with 1580 parts of isopropanol, the red colored crystals were collected on a filter and dried. The chloromethyl compound melted at 208° to 210° C.

*Analysis.*—Calc'd. for $C_{21}H_{14}NO_4Cl$: C, 66.5; H, 3.98; Cl, 9.34. Found: C, 66.8–67.9; H, 3.8; Cl, 8.13.

When equivalent amounts of 1-amino-4-hydroxy-2-(p-tolyloxy)-anthraquinone, 1-amino-4-hydroxy-2-(o-tolyloxy)anthraquinone, 1-amino-4-hydroxy-2-(m-tolyloxy)anthraquinone, 1-amino-4-hydroxy-2-(p-methoxyphenoxy)anthraquinone and 1-amino-2-(p-n-butoxyphenoxy)-4-hydroxyanthraquinone are substituted for 1-amino-4-hydroxy-2-phenoxyanthraquinone in this example, other 1-amino-2-(chloromethyl-tolyloxy)-4-hydroxyanthraquinone compounds or 1-amino-2-(chloromethyl-p-alkoxyphenoxy)-4-hydroxyanthraquinone compounds are obtained. Chloromethylation takes place preferentially at a free para position in the phenoxy ring. If the para position is blocked, chloromethylation occurs at an ortho or meta position. When one mole of 1-amino-4-hydroxy-2-(m-methoxyphenoxy)anthraquinone (U.S. 2,733,071, Example 9) is treated with one mole of bis-chloromethyl ether in 85% sulfuric acid at 10° C., the p-chloromethyl derivative is obtained.

All of these chloro methyl compounds contain a very reactive chlorine atom which reacts with secondary or tertiary amines to give anthraquinone dyes with pendant tertiary amino or quaternary ammonium groups, respectively.

*Example 2.—[p-(1-amino-4-hydroxy-2-anthraquinonyloxy)benzyl]triethyl-ammonium chloride*

A mixture of 9 parts of 1-amino-2-(α-chloro-p-tolyloxy)-4-hydroxyanthraquinone, 143 parts of chlorobenzene and 9 parts of triethylamine was stirred at 95° C. for five hours. The precipitate which formed was collected on a filter and washed with chlorobenzene. This product was dissolved in 200 parts of hot water and filtered to remove some insoluble material. After cooling in an ice bath and adding 20 parts of sodium chloride, the precipitate was filtered off. This final product dyes acid modified acrylic fibers and acid modified polyester fibers in red shades with excellent fastness properties from a slightly acidified, hot aqueous dye bath.

*Example 3.—[p-(1-amino-4-hydroxy-2-anthraquinonyl-oxy)benzyl]trimethyl-ammonium chloride*

A mixture of 110 parts of 1-amino-2-(α-chloro-p-tolyloxy)-4-hydroxyanthraquinone, 1620 parts of n-butanol, and 138 parts of trimethylamine was heated at 80° C. in an autoclave for three hours. After cooling, the quaternary ammonium salt was collected on a filter, washed with isopropanol, and dried. This product dyes acid modified acrylic fibers and acid modified polyester fibers in red shades from a hot, slightly acidified aqueous dyebath.

When an equivalent amount of pyridine, benzyldimethylamine, N-methylpiperidine, N-methylmorpholine, tri-n-butylamine, tri-n-propylamine, and triethanolamine is substituted for tri-methylamine in this example and the reaction mixture is heated at 95° C. for four hours, the corresponding quaternary ammonium salts are obtained which have similar properties to those of the dye described.

*Example 4.—1-amino-2-(α-diethylamino-p-tolyloxy)-4-hydroxyanthraquinone hydrochloride*

A mixture of 2 parts of 1-amino-2-(α-chloro-p-tolyloxy)-4-hydroxyanthraquinone, 1.4 parts of diethylamine and 22 parts of chlorobenzene was stirred at 100° C. for 10 hours. The chlorobenzene was removed by distillation under reduced pressure. The residue was dissolved in 230 parts of boiling isopropanol and filtered hot to remove a small quantity of insoluble material. After cooling, 1.2 parts of concentrated hydrochloric acid were added to the filtrate. Red crystals of 1-amino-2-(α-diethylamino-p-tolyloxy)-4-hydroxyanthraquinone hydrochloride were collected on a filter. This dye was completely soluble in warm water, from which it colored acid modified polyester and acrylic fibers in red shades having good fastness properties.

*Example 5.—1-amino-2-(α-dimethylamino-p-tolyloxy)-4-hydroxyanthraquinone hydrochloride*

A mixture of 14.5 parts of 1-amino-2-(α-chloro-p-tolyloxy)-4-hydroxyanthraquinone, 200 parts of n-butanol and 80 parts of a 30% solution (by weight) of dimethylamine in absolute ethanol was heated at 80° C. for 2 hours in an autoclave. After cooling, a violet colored impurity was removed by filtration. Concentrated hydrochloric acid was added to the filtrate to precipitate a red hydrochloride. This product was collected on a filter and washed with isopropanol. This product dyes acid modified polyester fibers in red shades from a slightly acidified, hot, aqueous dye bath.

*Example 6.—1-amino-2-(α-diethylanoamino-p-tolyloxy)-4-hydroxyanthraquinone hydrochloride*

A mixture of 11 parts of 1-amino-2-(α-chloro-p-tolyloxy)-4-hydroxyanthraquinone, 8.8 parts of diethanolamine and 28 parts of n-propanol was stirred at 95° C. for four hours. Addition of a few parts of concentrated hydrochloric acid caused the hydrochloride of 1-amino-2-(α - diethanolamino - p - tolyloxy) - 4 - hydroxyanthraquinone to separate out as red crystals. The crystalline product was collected on a filter and washed with n-propanol. From a hot aqueous dyebath it dyes acid modified polyester and acrylic fibers in red shades having excellent light-fastness.

*Example 7.—1-amino-2-(α-ethylethanolamino-p-tolyloxy)-4-hydroxyanthraquinone hydrochloride*

A mixture of 12 parts of 1-amino-2-(α-chloro-p-tolyloxy)-4-hydroxyanthraquinone, 48 parts of 2-ethoxyethanol, and 10 parts of ethylethanolamine is stirred at 90° to 95° C. for two hours. After cooling to 50° C., the warm mixture is clarified by filtration. Dry hydrogen chloride gas is passed into the clear red filtrate, to precipitate 1-amino-2-(α - ethylethanolamino-p-tolyloxy)-4-hydroxyanthraquinone hydrochloride as red crystals.

The product is collected on a filter and washed with 10 parts of isopropanol. This dye colors acid modified polyester and acrylic fibers in red shades having good fastness properties from a slightly acidic, hot, aqueous dyebath. The hydrochloride salt is easily soluble in hot water.

When an equivalent amount of piperidine, morpholine, methylbenzylamine, di-n-butylamine or di-iso-propylamine is substituted for ethylethanolamine in this example, other hydrochloride salts of basic red dyes are obtained which resemble 1-amino-2-(α-ethylethanolamino-p-tolyloxy)-4-hydroxy-anthraquinone hydrochloride in their dyeing properties. These dyes are readily dissolved in slightly acidified, hot, aqueous dyebaths, from which they color acid modified polyester fibers in red shades having good fastness properties.

*Example 8.—Free base form*

The hydrochloride salt of any of the tertiary amine dyes of Examples 4 to 7 is converted to the free base form by treating an aqueous suspension of the dye salt with one equivalent of aqueous sodium hydroxide. The free base of the dye is collected on a filter and washed with a little water and dried. The free bases are readily soluble in slightly acidic, hot, aqueous dye baths from which they color acid modified polyester fibers in red shades. Furthermore, these bases are very useful in the Thermosol dyeing of regular (i.e. non-acid modified) polyester fiber. By Thermosol dyeing here, is meant the process described and claimed in U.S. Patents 2,663,612 and 2,663,613.

*Example 9.—Quaternization of the free base*

To a solution of 10 parts of 1-amino-2-(α-diethylamino-p-tolyloxy) - 4 - hydroxyanthraquinone (free base from Examples 4 and 8) in approximately 160 parts of isopropanol is added 5 parts of dimethyl sulfate. The mixture is refluxed for four hours, cooled and filtered. The solid material is washed with isopropanol and then with acetone. The dry product, [p-(1-amino-4-hydroxy-2 - anthraquinonyloxy)benzyl] diethylmethylammonium methyl sulfate is a red powder which dissolves readily in water to give a red solution. It has the formula

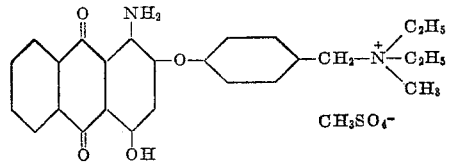

In a similar manner, the dimethyl sulfate in this quaternization procedure may be replaced by equivalent amounts of dipropyl sulfate, dibutyl sulfate, diethylsulfate or methyl p-toluene sulfonate.

Likewise the aliphatic halides such as ethyl bromide as well as the aryl- or aralkyl substituted aliphatic halides such as p-$CH_3$—$C_6H_4$—$CH_2Cl$ or $C_6H_5$—$CH_2CH_2$—Cl, or benzyl chloride or their bromo analogs may be used as quaternizing agents in this invention. Usually a temperature of 70° to 100° C. is sufficient to complete the quaternization reaction with these halide compounds. Solvents for this reaction include the lower alcohols, acetone, monochlorobenzene and nitrobenzene.

It will be understood that the details of the above examples may be varied widely, within the skill of those engaged in this art. Thus, while the products of Examples 4 to 7 have been isolated as tertiary amine hydrochlorides, it is clear that other mineral acids can be used to precipitate the dye, for instance hydrobromic, sulfuric or phosphoric.

The practical achievements of this invention will now be readily apparent. The primary use for my novel dyes is their application to acid modified polyester fiber. The new dyes are particularly useful in the formulation of tan and gray shades, where a red dye of good light-fastness is required, as in fibers for men's wear.

Among the outstanding advantages are good application and fastness properties of my novel dyes on said fiber, whether the latter is used alone or in mixture with acid modified acrylic fiber.

I claim as my invention:

1. A compound selected from the group consisting of the free base form, salts and quaternization products of the anthraquinonyloxy-benzyl-amines of the formula

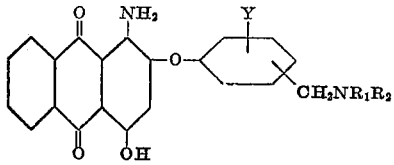

wherein Y stands for hydrogen, methyl or methoxy, while $NR_1R_2$ represents a nitrogenous base radical of the group consisting of dialkylamino, diethanolamino, monoalkyl-monoethanolamino, monoalkyl-monobenzylamino, mono-ethanol-monobenzylamino, morpholino and piperidino, said alkyl groups having not more than 4 C-atoms each.

2. [p-(1 - amino-4-hydroxy-2-anthaquinonyloxy)benzyl] trimethylammonium chloride.

3. 1-amino-2-(α-diethylamino-p-tolyloxy) - 4 - hydroxy-anthraquinone.

References Cited in the file of this patent
UNITED STATES PATENTS 2,773,071    Pizzarello et al. _____ Dec. 4, 1956

UNITED STATES PATENT OFFICE

Certificate of Correction

Patent No. 2,888,467　　　　　　　　　　　　　　　　　　　　　　　May 26, 1959

John William Richter

It is hereby certified that error appears in the printed specification of the above numbered patent requiring correction and that the said Letters Patent should read as corrected below.

Column 3, line 52, for "*-1-amino-2-(α-diethylanoamino-p-tolyloxy)-*" read ‑‑ *-1-amino-2-(α-diethanolamino-p-tolyloxy)-* ‑‑.

Signed and sealed this 3rd day of November 1959.

[SEAL]

Attest:
KARL H. AXLINE,
*Attesting Officer.*

ROBERT C. WATSON,
*Commissioner of Patents.*